United States Patent
Yang et al.

(10) Patent No.: US 12,307,418 B2
(45) Date of Patent: May 20, 2025

(54) PRODUCT MANAGEMENT METHOD AND RELATED DEVICE

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventors: Bingcheng Yang, Beijing (CN); Qiwen Liu, Beijing (CN)

(73) Assignees: Beijing Wodong Tianjun Information Technology Co., Ltd., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 297 days.

(21) Appl. No.: 18/000,133

(22) PCT Filed: Apr. 30, 2021

(86) PCT No.: PCT/CN2021/091659
§ 371 (c)(1),
(2) Date: Nov. 29, 2022

(87) PCT Pub. No.: WO2021/238589
PCT Pub. Date: Dec. 2, 2021

(65) Prior Publication Data
US 2023/0214766 A1  Jul. 6, 2023

(30) Foreign Application Priority Data
May 29, 2020  (CN) .......................... 202010474989.5

(51) Int. Cl.
*G06Q 10/087* (2023.01)
*G06Q 10/10* (2023.01)

(52) U.S. Cl.
CPC ................................. *G06Q 10/087* (2013.01)

(58) Field of Classification Search
CPC .................................................... G06Q 10/087
(Continued)

(56) References Cited

U.S. PATENT DOCUMENTS

| | | | | |
|---|---|---|---|---|
| 2006/0229887 A1* | 10/2006 | Liang | ................... | G06Q 10/087 705/28 |
| 2019/0392380 A1* | 12/2019 | O'Brien | ............... | G06Q 10/087 |
| 2021/0334735 A1* | 10/2021 | Meszaros | ............... | G06Q 10/06 |

FOREIGN PATENT DOCUMENTS

| | | |
|---|---|---|
| CN | 206058271 U | 3/2017 |
| CN | 106778952 A | 5/2017 |

(Continued)

OTHER PUBLICATIONS

2nd Office Action dated Apr. 11, 2024 for Chinese Application No. 202010474989.5.
(Continued)

*Primary Examiner* — Garcia Ade
(74) *Attorney, Agent, or Firm* — Qinghong Xu (57) ABSTRACT

A product management method and apparatus, a computer readable storage medium, and an electronic device, relating to the technical fields of computers and communications. The method comprises: acquiring, by means of a warehouse management system or a smart shelf, a product quantity in a display area and a maximum product display quantity in the display area, so as to obtain a product shortage quantity in the display area; acquiring, by means of the warehouse management system or the smart shelf, a product stock quantity in a warehouse; acquiring a product replenishment quantity according to the product shortage quantity in the display area and the product stock quantity in the warehouse; sending the product replenishment quantity to a personal digital assistant; and receiving stock keeping unit information input by a worker by means of the personal digital assistant, so as to acquire goods location information (Continued)

of the product, so that the worker completes the replenishment of the product according to the goods location information and the product replenishment quantity, wherein the product replenishment quantity is less than or equal to the product stock quantity in the warehouse.

9 Claims, 6 Drawing Sheets

(58) Field of Classification Search
USPC .......................................................... 705/28
See application file for complete search history.

(56) References Cited

FOREIGN PATENT DOCUMENTS

| | | |
|---|---|---|
| CN | 108428082 A | 8/2018 |
| CN | 108846600 A | 11/2018 |
| CN | 108985691 A | 12/2018 |
| CN | 109191674 A | 1/2019 |
| CN | 109508920 A | 3/2019 |
| CN | 109636278 A | 4/2019 |
| CN | 109754207 A | 5/2019 |
| CN | 110363912 A | 10/2019 |
| CN | 110880084 A | 3/2020 |
| CN | 111080183 A | 4/2020 |
| KR | 20170059248 A | 5/2017 |
| KR | 101778758 B1 | 9/2017 |
| WO | 2018227694 A1 | 12/2018 |

OTHER PUBLICATIONS

Extended European Search Report dated Apr. 23, 2024 for European Application No. 21814306.3.
International Search Report dated Jul. 27, 2021 of International Application No. PCT/CN2021/091659.
1st Office Action dated Nov. 17, 2023 for Chinese Application No. 202010474989.5.

* cited by examiner

PRODUCT MANAGEMENT METHOD AND RELATED DEVICE

CROSS REFERENCE

The present disclosure claims priority to Chinese Patent Application No. 202010474989.5, filed on May 29, 2020, entitled "PRODUCT MANAGEMENT METHOD AND RELATED DEVICE", the entire contents of which are incorporated herein by reference in its entirety.

TECHNICAL FIELD

The present disclosure relates to the field of computer and communication technologies, and in particular, to a product management method and apparatus, a computer-readable storage medium, and an electronic device.

BACKGROUND

At present, the product in shopping malls or stores is replenished by a replenishment clerk or tally clerk. The replenishment clerk or tally clerk patrols the field, to check whether the product needs to be replenished, to check the location and quantity of the product warehouse through the personal digital assistant, and to manually estimate the number of replenished products. The existing process relies on the replenishment clerk or tally clerk to manually estimate the number of replenished products, which is inefficient and cannot obtain the data for replenishing each node.

It should be noted that the information disclosed in the above Background section is only for enhancement of understanding of the background of the present disclosure, and therefore may contain information that does not form the prior art that is already known to a person of ordinary skill in the art.

SUMMARY

Embodiments of the present disclosure provide a product management method and apparatus, a computer-readable storage medium, and an electronic device.

Other features and advantages of the present disclosure will become apparent from the following detailed description, or be learned in part by practice of the present disclosure.

According to an aspect of the present disclosure, there is provided a product management method, including:

acquiring, by means of a warehouse management system or a smart shelf, a product quantity in a display area and a maximum product display quantity in the display area, so as to obtain a product shortage quantity in the display area;

acquiring, by means of the warehouse management system or the smart shelf, a product stock quantity in a warehouse;

acquiring a product replenishment quantity according to the product shortage quantity in the display area and the product stock quantity in the warehouse;

sending the product replenishment quantity to a personal digital assistant; and receiving stock keeping unit information input by a worker by means of the personal digital assistant, so as to acquire goods location information of a product, so that the worker completes replenishment of the product according to the goods location information and the product replenishment quantity, wherein the product replenishment quantity is less than or equal to the product stock quantity in the warehouse.

In an embodiment, said receiving stock keeping unit information input by a worker by means of the personal digital assistant, so as to acquire goods location information of a product, so that the worker completes replenishment of the product according to the goods location information and the product replenishment quantity includes:

receiving a storage situation of the product in the display area and the warehouse acquired by the worker by scanning the stock keeping unit information of the product through the personal digital assistant, so that the worker completes replenishment of the product according to the storage situation of the product in the display area and the warehouse and the product replenishment quantity.

In an embodiment, the method further includes:

receiving an instruction from a manager to achieve replenishment of the product.

In an embodiment, said receiving an instruction from a manager to achieve replenishment of the product includes:

receiving an instruction from the manager at a specific point in time to achieve replenishment of the product.

In an embodiment, said receiving an instruction from a manager to achieve replenishment of the product includes:

receiving an instruction from the manager at a specific wave to achieve replenishment of the product.

In an embodiment, said receiving an instruction from a manager to achieve replenishment of the product includes:

receiving an instruction from the manager at a specific time interval to achieve replenishment of the product.

In an embodiment, the method further includes:

sending a notification to replenish the product in the warehouse in time in response that the product stock quantity in a warehouse is less than or equal to the product replenishment quantity.

According to an aspect of the present disclosure, there is provided an apparatus for replenishing products, including:

an acquiring module, configured to acquire, by means of a warehouse management system or a smart shelf, a product quantity in a display area and a maximum product display quantity in the display area, so as to obtain a product shortage quantity in the display area, and acquire a product stock quantity in a warehouse by means of the warehouse management system or the smart shelf;

a calculating module, configured to acquire a product replenishment quantity according to the product shortage quantity in the display area and the product stock quantity in the warehouse, wherein the product replenishment quantity is less than or equal to the product stock quantity in the warehouse;

a sending module, configured to send the product replenishment quantity to a personal digital assistant; and a receiving module, configured to receive stock keeping unit information input by a worker by means of the personal digital assistant, so as to acquire goods location information of a product, so that the worker completes replenishment of the product according to the goods location information and the product replenishment quantity.

According to an aspect of the present disclosure, there is provided an electronic device, including:

one or more processors;

a storage apparatus, configured to store one or more programs which, when executed by the one or more processors, cause the one or more processors to implement any one of the methods described above.

According to an aspect of the present disclosure, there is provided a computer-readable storage medium, storing a computer program, wherein the computer program implements any one of the methods described above when executed by a processor.

It should be noted that the above general description and the following detailed description are merely exemplary and exemplary and should not be construed as limiting of the present disclosure.

BRIEF DESCRIPTION OF THE DRAWINGS

The accompanying drawings, which are incorporated in and constitute a part of this specification, illustrate embodiments consistent with the disclosure and serve to explain the principles of the disclosure together with the description. The drawings in the following description are only some embodiments of the present disclosure, and for those of ordinary skill in the art, other drawings can also be obtained from these drawings without creative effort. In the drawings.

DETAILED DESCRIPTION

Example embodiments will now be described more fully with reference to the accompanying drawings. Example embodiments, however, can be embodied in various forms and should not be construed as limited to the embodiments set forth herein; rather, these embodiments are provided so that this disclosure will be thorough and complete, and will fully convey the concept of example embodiments to those skilled in the art.

Furthermore, the described features, structures, or characteristics may be combined in any suitable manner in one or more embodiments. In the following description, numerous specific details are provided in order to give a thorough understanding of the embodiments of the present disclosure. However, those skilled in the art will appreciate that the technical solutions of the present disclosure may be practiced without one or more of the specific details, or other methods, components, devices, steps, etc. may be employed. In other instances, well-known methods, devices, implementations, or operations have not been shown or described in detail to avoid obscuring aspects of the present disclosure.

The block diagrams shown in the figures are merely functional entities and do not necessarily correspond to physically separate entities. That is, these functional entities may be implemented in software, or in one or more hardware modules or integrated circuits, or in different networks and/or processor devices and/or microcontroller devices.

The flowcharts shown in the figures are only exemplary illustrations and do not necessarily include all contents and operations/steps, nor do they have to be performed in the described order. For example, some operations/steps can be decomposed, and some operations/steps can be combined or partially combined, so the actual execution order may be changed according to actual situations.

Figure 1:
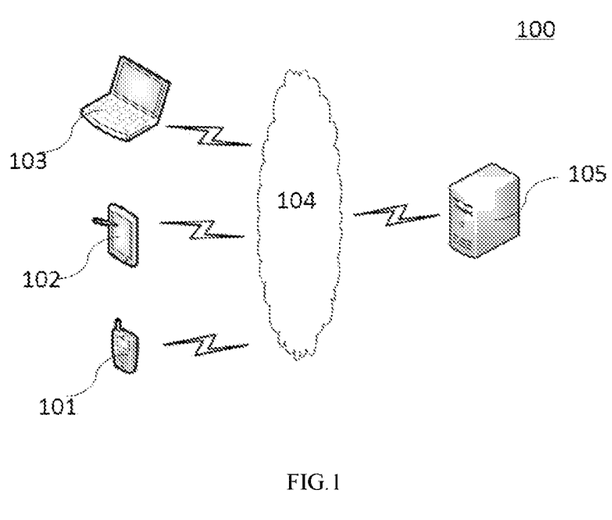
FIG. 1 shows a schematic diagram of an exemplary system architecture of a product management method or a product management apparatus to which embodiments of the present disclosure can be applied.

FIG. 1 shows a schematic diagram of an exemplary system architecture 100 of a product management method or a product management apparatus to which embodiments of the present disclosure may be applied.

As shown in FIG. 1, the system architecture 100 may include one or more of terminal devices 101, 102 and 103, a network 104 and a server 105. The network 104 is the medium used to provide the communication link between the terminal devices 101, 102, 103 and the server 105. The network 104 may include various connection types, such as wired, wireless communication links, or fiber optic cables, or the like.

It should be understood that the numbers of terminal devices, networks and servers in FIG. 1 are merely illustrative. There can be any number of terminal devices, networks and servers according to implementation requirements. For example, the server 105 may be a server cluster composed of a plurality of servers, or the like.

The user can use the terminal devices 101, 102, 103 to interact with the server 105 through the network 104, to receive or send messages and the like. The terminal devices 101, 102, 103 may be various electronic devices with display screens, including but not limited to smart phones, tablet computers, portable and desktop computers, digital movie projectors, and the like.

The server 105 may be a server that provides various services. For example, a user (manager) sends a management request of the product to the server 105 by using the terminal device 103 (which may also be the terminal device 101 or 102). Or, the terminal device 103 automatically sends the management request of the product to the server 105 in real time (at regular time). The server 105 can acquire, by means of a warehouse management system or a smart shelf, a product quantity in a display area and a maximum product display quantity in the display area based on the management request of the product, so as to obtain a product shortage quantity in the display area; acquire, by means of the warehouse management system or the smart shelf, a product stock quantity in a warehouse; acquire a product replenishment quantity according to the product shortage quantity in the display area and the product stock quantity in the warehouse; send the product replenishment quantity to a personal digital assistant (terminal device); and receive stock keeping unit information input by a worker by means of the personal digital assistant, so as to acquire goods location information of a product, so that the worker completes replenishment of the product according to the goods location information and the product replenishment quantity. The product replenishment quantity is less than or equal to the product stock quantity in the warehouse.

For another example, the terminal device 103, which may also be the terminal device 101 or 102, may be a smart TV, a VR (Virtual Reality)/AR (Augmented Reality) helmet display, or a mobile terminal with a navigation or online car-hailing, instant messaging, video applications (APP) installed thereon, such as a smart phone, a tablet computer, or the like. The user can send a management request of the product to the server 105 through the smart TV, VR/AR helmet display or the navigation, online car-hailing, instant messaging, video APP. The server 105 can obtain the management plan of the product based on the management request of the product, and return the management plan of the product to the smart TV, VR/AR helmet display or the navigation, online car-hailing, instant messaging, and video APP, and then display the returned management plan of the product through the smart TV, VR/AR helmet display or the navigation, online car-hailing, instant messaging, video APP.

Figure 2:
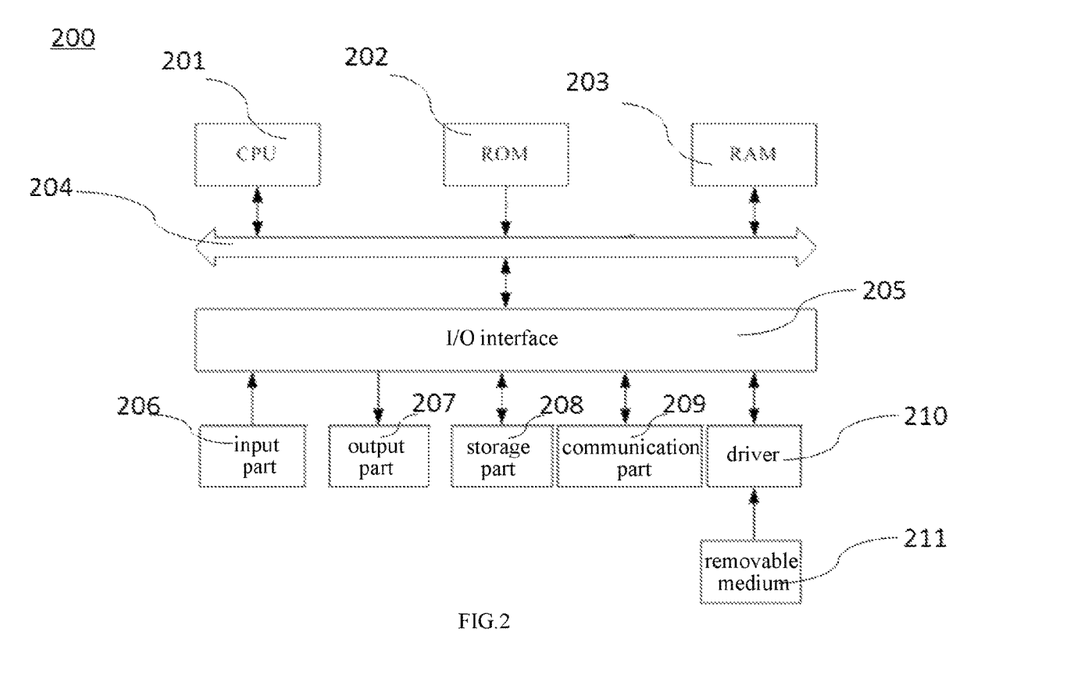
FIG. 2 shows a schematic structural diagram of a computer system suitable for implementing an electronic device according to an embodiment of the present disclosure.

FIG. 2 shows a schematic structural diagram of a computer system suitable for implementing an electronic device according to an embodiment of the present disclosure.

It should be noted that the computer system 200 of the electronic device shown in FIG. 2 is only an example, and should not impose any limitations on the functions and scope of use of the embodiments of the present disclosure.

As shown in FIG. 2, the computer system 200 includes a central processing unit (CPU) 201, which can execute various appropriate actions and processes based on a program stored in a read-only memory (ROM) 202 or a program loaded to a random access memory (RAM) 203 from a storage part 208. In the RAM 203, various programs and data required by the system operation are also stored. The CPU 201, the ROM 202, and the RAM 203 are connected to each other through a bus 204. An input/output (I/O) interface 205 is also connected to the bus 204.

The following components are connected to the I/O interface 205: an input part 206 including a keyboard, a mouse, etc.; an output part 207 including a cathode ray tube (CRT), a liquid crystal display (LCD), and a speaker, etc.; a storage part 208 including a hard disk, etc.; and a communication part 209 including a network interface card such as a LAN (Local Area Network) card, a modem, etc. The communication part 209 performs communication processing via a network such as the Internet. A driver 210 is also connected to the I/O interface 205 as needed. A removable medium 211, such as a magnetic disk, an optical disk, a magneto-optical disk, a semiconductor memory, etc., is mounted on the driver 210 as needed, so that a computer program read therefrom is installed into the storage part 208 as needed.

According to embodiments of the present disclosure, the processes described below with reference to the flowcharts may be implemented as computer software programs. For example, embodiments of the present disclosure include a computer program product including a computer program carried on a computer-readable storage medium. The computer program contains program codes for performing the method illustrated in the flowchart. In such an embodiment, the computer program may be downloaded from and installed on the network through the communication part 209 and/or installed from the removable medium 211. When the computer program is executed by the central processing unit (CPU) 201, various functions defined in the method and/or apparatus of the present application are performed.

It should be noted that the computer-readable storage medium shown in the present disclosure may be a computer-readable signal medium or a computer-readable storage medium, or any combination of the above two. The computer-readable storage medium can be, for example, but not limited to, an electrical, magnetic, optical, electromagnetic, infrared, or semiconductor system, apparatus or device, or a combination of any of the above. More specific examples of computer readable storage media may include, but not limited to, electrical connections with one or more wires, portable computer disks, hard disks, random access memory (RAM), read only memory (ROM), erasable Programmable read only memory (EPROM) or flash memory, optical fiber, portable compact disk read only memory (CD-ROM), optical storage devices, magnetic storage devices, or any suitable combination of the above. In this disclosure, a computer-readable storage medium may be any tangible medium that contains or stores a program that can be used by or used in conjunction with an instruction execution system, apparatus, or device. In the present disclosure, however, a computer-readable signal medium may include a data signal propagated in baseband or as part of a carrier wave, which carries computer-readable program codes therein. Such propagated data signals may take a variety of forms, including but not limited to electromagnetic signals, optical signals, or any suitable combination of the above. A computer-readable signal medium can also be any computer-readable storage medium other than a computer-readable storage medium. The computer-readable storage medium can send, propagate, or transmit a program used by or used in conjunction with an instruction execution system, apparatus, or device. The program code contained on the computer-readable storage medium can be transmitted by any suitable medium, including but not limited to: wireless, wire, optical cable, RF (Radio Frequency), etc., or any suitable combination of the above.

The flowchart and block diagrams in the figures illustrate the architecture, functionality, and operation that may be implemented by the methods, apparatus and computer program products according to various embodiments of the present disclosure. In this regard, each block in the flowchart or block diagrams may represent a module, segment, or portion of code that contains one or more executable instructions for implementing specified logical functions. It should also be noted that, in some alternative implementations, the functions noted in the blocks may occur in an order different from that noted in the figures. For example, two blocks shown in succession may, in fact, be executed substantially concurrently, or executed in the reverse order sometimes, depending upon the functionality involved. It is also noted that each block of the block diagrams or flowcharts, and the combination of blocks in the block diagrams or flowcharts, can be implemented using special purpose hardware-based systems that perform the specified functions or operations, or can be implemented using a combination of dedicated hardware and computer instructions.

The modules and/or units and/or sub-units described in the embodiments of the present disclosure may be implemented by software or hardware. The described modules and/or units and/or sub-units can also be set in the processor. The names of these modules and/or units and/or sub-units do not constitute limitations on the modules and/or units and/or sub-units under certain circumstances.

As another aspect, the present application also provides a computer-readable storage medium. The computer-readable storage medium may be included in the electronic device described in the above embodiments; or may also be present alone and not assembled in the electronic device. The above computer-readable storage medium carries one or more programs. When the above one or more programs are executed by an electronic device, the electronic device is enabled to implement the methods described in the following embodiments. For example, the electronic device can implement various steps shown in FIG. 3.

In related technologies, for example, machine learning methods, deep learning methods, etc. can be used to manage products, and different methods are applicable to different scopes.

Figure 3:
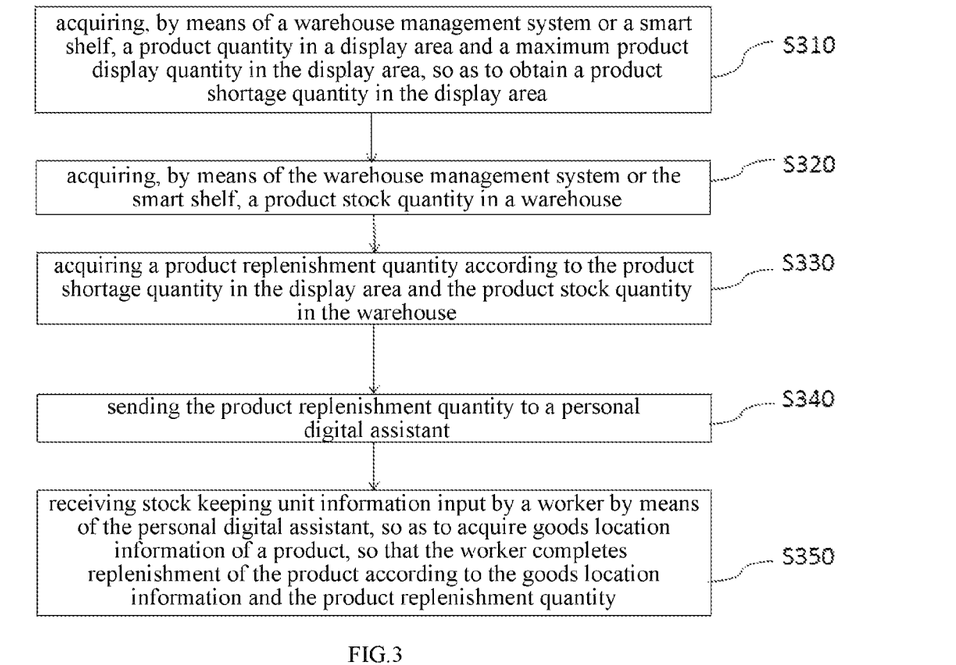
FIG. 3 schematically shows a flowchart of a product management method according to an embodiment of the present disclosure.

FIG. 3 schematically shows a flowchart of a product management method according to an embodiment of the present disclosure. The method steps of the embodiments of the present disclosure may be executed by a terminal device, a server, or interactively executed by a terminal device and a server. For example, the method steps may be executed by the server 105 in FIG. 1, but the present disclosure is not limited to this.

In step S310, a product quantity in a display area and a maximum product display quantity in the display area are acquired by means of a warehouse management system or a smart shelf, so as to obtain a product shortage quantity in the display area.

In this step, the terminal or processor acquires a product quantity in a display area and a maximum product display quantity in the display area by means of a warehouse management system (WMS) or a smart shelf, so as to obtain a product shortage quantity in the display area. The product quantity in a display area is, for example, the number of existing products on the shelves used for shopping by customers in the mall. The maximum product display quantity in the display area is, for example, the maximum number of products carried on the shelves in the mall. For example, if the existing number of products on a shelf is 3, and the maximum number of products carried by the shelf is 10, the product shortage quantity in the display area is 7. The warehouse management system can record the maximum product display quantity on the shelf, the sales or delivery of products, so that the existing product quantity and the product shortage quantity can be obtained according to the recorded data. The smart shelf has the function of statistical or monitoring, which can provide the existing product quantity and the product shortage quantity in real time.

In step S320, a product stock quantity in a warehouse is acquired by means of the warehouse management system or the smart shelf.

In this step, the terminal or processor obtains the product stock quantity in a warehouse. For example, the product stock quantity in a warehouse of a mall is 5 or 20.

In step S330, a product replenishment quantity is acquired according to the product shortage quantity in the display area and the product stock quantity in the warehouse, wherein the product replenishment quantity is less than or equal to the product stock quantity in the warehouse.

In this step, the terminal or processor acquires a product replenishment quantity according to the product shortage quantity in the display area and the product stock quantity in the warehouse. For example, when the product shortage quantity in the display area is 7 and the product stock quantity in a warehouse is 5, the product replenishment quantity is 5. For example, when the product shortage quantity in the display area is 7 and the product stock quantity is 20, the product replenishment quantity is 7.

In step S340, the product replenishment quantity is sent to a personal digital assistant.

In this step, the terminal or the processor sends the product replenishment quantity to the personal digital assistant, PDA, (a personal digital assistant held by a worker).

In step S350, stock keeping unit information input by a worker by means of the personal digital assistant is received, so as to acquire goods location information of a product, so that the worker completes replenishment of the product according to the goods location information and the product replenishment quantity.

In this step, the terminal or the processor receives stock keeping unit information input by a worker, so as to acquire goods location information of a product, so that the worker completes replenishment of the product according to the goods location information and the product replenishment quantity. The stock keeping unit is SKU. In one embodiment, the terminal or processor receives the stock keeping unit information of the product scanned by the worker through a personal digital assistant, and further acquires the storage situation of the product in the display area and the warehouse, so that the worker can complete replenishment of the product according to the storage situation of the product in the display area and the warehouse, and the product replenishment quantity. That is, by receiving the stock keeping unit information of the product scanned by the worker through the personal digital assistant, the terminal or processor may acquire the storage situation of the product in the display area and the warehouse. The terminal or processor can feed back the storage situation of the product in the display area and the warehouse to the personal digital assistant of the worker, so that the worker can complete replenishment of the product according to the storage situation and the product replenishment quantity.

In this application, by acquiring a product quantity in a display area and a maximum product display quantity in the display area so as to obtain a product shortage quantity in the display area; acquiring a product stock quantity in a warehouse; acquiring a product replenishment quantity according to the product shortage quantity in the display area and the product stock quantity in the warehouse; sending the product replenishment quantity to a personal digital assistant; and receiving stock keeping unit information input by a worker so as to acquire goods location information of a product, so that the worker completes replenishment of the product according to the goods location information, wherein the product replenishment quantity is less than or equal to the product stock quantity in the warehouse, which can improve product replenishment efficiency.

In one embodiment, the method shown in FIG. 3 further includes the step of: receiving an instruction from a manager to achieve replenishment of the product. In this step, the terminal or processor realizes the replenishment of the product by receiving the instruction of the manager.

In one embodiment, the terminal or processor receives an instruction from the manager at a specific point in time to achieve replenishment of the product. That is, the manager sends out a replenishment instruction or performs a replenishment operation at fixed time points (e.g., 9:00, 12:00, etc.).

In one embodiment, the terminal or processor receives an instruction from the manager at a specific wave to achieve replenishment of the product. That is, the manager sends out four replenishment instructions or performs four replenishment operations in one day.

In one embodiment, the terminal or processor receives an instruction from the manager at a specific time interval to achieve replenishment of the product. That is, the manager sends out one replenishment instruction or performs one replenishment operation every 1 hour.

In one embodiment, the terminal or server sends a notification to replenish the product in the warehouse in time in response that the product stock quantity in a warehouse is less than or equal to the product replenishment quantity. For example, when the product stock quantity in a warehouse is less than or equal to the product replenishment quantity, the terminal or the server sends a prompt message to prompt the manager or worker to replenish the products to the warehouse.

Figure 4:
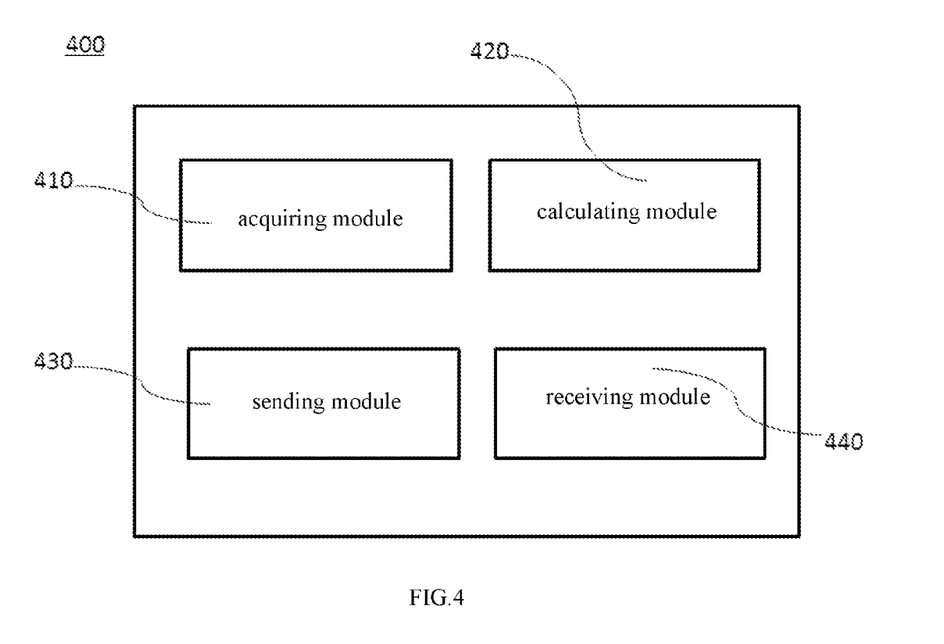
FIG. 4 schematically shows a block diagram of a product management apparatus according to an embodiment of the present disclosure.

FIG. 4 schematically shows a block diagram of a product management apparatus according to an embodiment of the present disclosure. The apparatus for replenishing products 400 provided by the embodiment of the present disclosure may be set on the terminal device or the server side, or partially on the terminal device and partially on the server side. For example, it may be set on the server 105 in FIG. 1, but the present disclosure is not limited to this.

The apparatus for replenishing products 400 provided by an embodiment of the present disclosure may include an acquiring module 410, a calculating module 420, a sending module 430, and a receiving module 440.

In the embodiment, the acquiring module 410 is configured to acquire, by means of a warehouse management system or a smart shelf, a product quantity in a display area and a maximum product display quantity in the display area, so as to obtain a product shortage quantity in the display area, and acquire a product stock quantity in a warehouse by means of the warehouse management system or the smart shelf. The calculating module 420 is configured to acquire a product replenishment quantity according to the product shortage quantity in the display area and the product stock quantity in the warehouse, wherein the product replenishment quantity is less than or equal to the product stock quantity in the warehouse. The sending module 430 is configured to send the product replenishment quantity to a personal digital assistant. The receiving module 440 is configured to receive stock keeping unit information input by a worker by means of the personal digital assistant, so as to acquire goods location information of a product, so that the worker completes replenishment of the product according to the goods location information and the product replenishment quantity.

The apparatus for replenishing products 400 acquires a product quantity in a display area and a maximum product display quantity in the display area so as to obtain a product shortage quantity in the display area; acquires a product stock quantity in a warehouse; acquires a product replenishment quantity according to the product shortage quantity in the display area and the product stock quantity in the warehouse; sends the product replenishment quantity to a personal digital assistant; and receives stock keeping unit information input by a worker so as to acquire goods location information of a product, so that the worker completes replenishment of the product according to the goods location information, wherein the product replenishment quantity is less than or equal to the product stock quantity in the warehouse, which can improve product replenishment efficiency.

According to an embodiment of the present disclosure, the above apparatus for replenishing products 400 can be used to implement the product management method described in the embodiment of FIG. 3.

Figure 5:
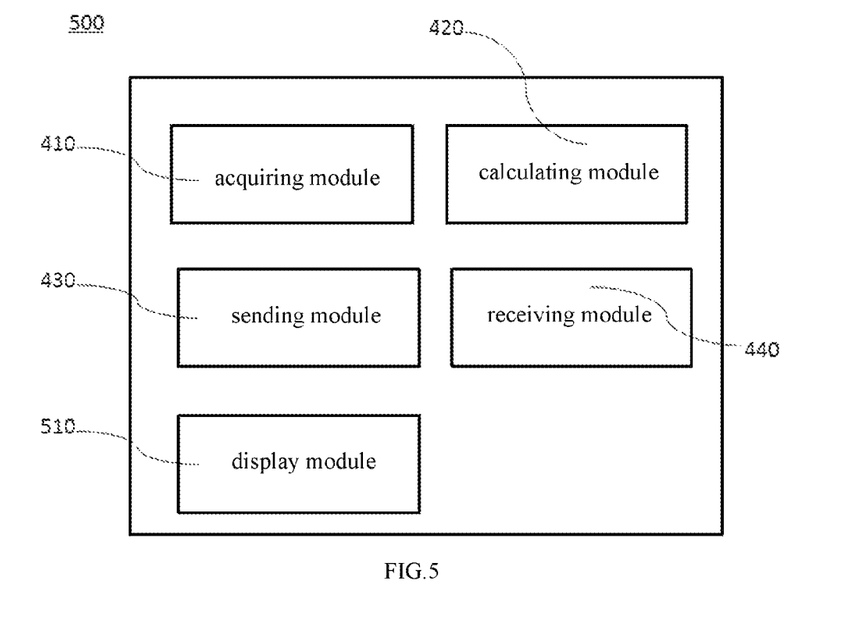
FIG. 5 schematically shows a block diagram of a product management apparatus according to another embodiment of the present disclosure.

FIG. 5 schematically shows a block diagram of a product management apparatus 500 according to another embodiment of the present disclosure.

As shown in FIG. 5, in addition to the acquiring module 410, the calculating module 420, the sending module 430, and the receiving module 440 described in the embodiment of FIG. 4, the product management apparatus 500 further includes a display module 510.

After the calculating module 420 completes the calculation, the display module 510 displays the calculation result on the terminal. The display module 510 can also display the goods location information on the terminal.

In the product management apparatus 500, the display module 510 can intuitively display the results.

Figure 6:
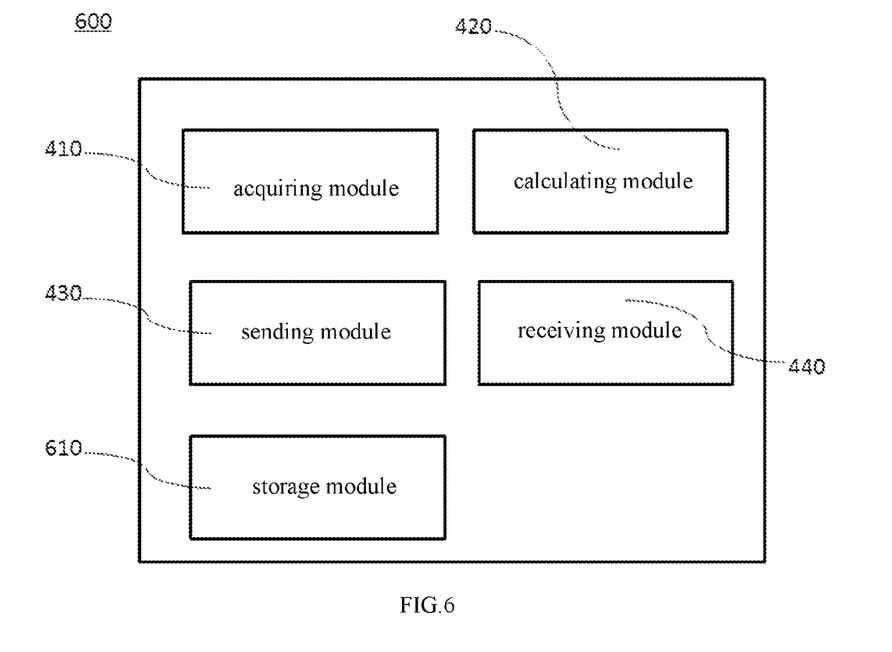
FIG. 6 schematically shows a block diagram of a product management apparatus according to another embodiment of the present disclosure.

FIG. 6 schematically shows a block diagram of a product management apparatus 600 according to another embodiment of the present disclosure.

As shown in FIG. 6, in addition to the acquiring module 410, the calculating module 420, the sending module 430, and the receiving module 440 described in the embodiment of FIG. 4, the product management apparatus 600 further includes a storage module 610.

Specifically, the storage module 610 is configured to store the calculation result of the replenishment of the product and the goods location information of the replenishment of the product, so as to facilitate invocation and reference by the worker or the server.

It can be understood that the acquiring module 410, the calculating module 420, the sending module 430, the receiving module 440, the display module 510 and the storage module 610 may be combined in one module for implementation, or any one of the modules may be split into a plurality of modules. Alternatively, at least part of the function of one or more of these modules may be combined with at least part of the function of other modules and implemented in one module. According to an embodiment of the present disclosure, at least one of the acquiring module 410, the calculating module 420, the sending module 430, the receiving module 440, the display module 510 and the storage module 610 may be at least partially implemented as a hardware circuit, such as a field programmable gate array (FPGA), Programmable Logic Array (PLA), System-on-Chip, System-on-Substrate, System-on-Package, Application-Specific Integrated Circuit (ASIC), or may be implemented in hardware or firmware in any other reasonable way of integrating or packaging circuits, or implemented in an appropriate combination of software, hardware and firmware. Alternatively, at least one of the acquiring module 410, the calculating module 420, the sending module 430, the receiving module 440, the display module 510 and the storage module 610 may be at least partially implemented as a computer program module. When the program is run by a computer, it can execute the function of the corresponding module.

Since each module of the product management apparatus of the exemplary embodiment of the present disclosure can be used to implement the steps of the exemplary embodiment of the product management method described in FIG. 3, for details not disclosed in the apparatus embodiments of the present disclosure, please refer to embodiments of the product management method of the present disclosure described above.

For the specific implementation of each module, unit and sub-unit in the product management apparatus provided by the embodiment of the present disclosure, reference may be made to the content in the above-mentioned product management method, which will not be repeated herein.

It should be noted that although several modules, units and sub-units of the apparatus for action performance are mentioned in the above detailed description, this division is not mandatory. Indeed, according to embodiments of the present disclosure, the features and functions of two or more modules, units and sub-units described above may be embodied in one module, unit and sub-unit. Conversely, the features and functions of one module, unit and sub-unit described above may be further divided to be embodied by a plurality of modules, units and sub-units.

From the description of the above embodiments, those skilled in the art can easily understand that the exemplary embodiments described herein may be implemented by software, or may be implemented by software combined with necessary hardware. Therefore, the technical solution according to the embodiments of the present disclosure may be embodied in the form of a software product. The software product may be stored in a non-volatile storage medium (which may be a CD-ROM, U disk, mobile hard disk, etc.) or on a network, including several instructions to cause a computing device (which may be a personal computer, a server, a touch terminal, or a network device, etc.) to execute the method according to an embodiment of the present disclosure.

Other embodiments of the present disclosure will readily occur to those skilled in the art upon consideration of the specification and practice of the disclosure disclosed herein. This application is intended to cover any variations, uses, or adaptations of the present disclosure that follow the general principles of the present disclosure and include common knowledge or conventional technical solutions in the technical field not disclosed by the present disclosure. The specification and embodiments are to be regarded as exemplary only, with the true scope and spirit of the disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A product management method, performed by a terminal device, comprising:
   acquiring, by means of a warehouse management system or a smart shelf, a product quantity in a display area and a maximum product display quantity in the display area, wherein the product quantity in the display area is a number of existing products on the smart shelf, and the maximum product display quantity in the display area is a maximum number of products carried on the smart shelf, so as to obtain a product shortage quantity in the display area by subtracting the product quantity in the display area from the maximum product display quantity in the display area;
   acquiring, by means of the warehouse management system or the smart shelf, a product stock quantity in a warehouse;
   acquiring a product replenishment quantity according to the product shortage quantity in the display area and the product stock quantity in the warehouse, wherein in response to that the product shortage quantity is larger than the product stock quantity, the product replenishment quantity is equal to the product stock quantity, and in response to that the product shortage quantity is smaller than the product stock quantity, the product replenishment quantity is equal to the product shortage quantity;
   sending the product replenishment quantity to a personal digital assistant; and
   receiving stock keeping unit information input by a worker by means of the personal digital assistant, so as to acquire goods location information of a product, so that the worker completes replenishment of the product according to the goods location information and the product replenishment quantity.

2. The method according to claim 1, wherein said receiving stock keeping unit information input by a worker by means of the personal digital assistant, so as to acquire goods location information of a product, so that the worker completes replenishment of the product according to the goods location information and the product replenishment quantity comprises:
   receiving a storage situation of the product in the display area and the warehouse acquired by the worker by scanning the stock keeping unit information of the product through the personal digital assistant, so that the worker completes replenishment of the product according to the storage situation of the product in the display area and the warehouse and the product replenishment quantity.

3. The method according to claim 1, further comprising:
   receiving an instruction from a manager to achieve replenishment of the product.

4. The method according to claim 3, wherein said receiving an instruction from a manager to achieve replenishment of the product comprises:
   receiving an instruction from the manager at a specific point in time to achieve replenishment of the product.

5. The method according to claim 3, wherein said receiving an instruction from a manager to achieve replenishment of the product comprises:
   receiving an instruction from the manager at a specific wave to achieve replenishment of the product.

6. The method according to claim 3, wherein said receiving an instruction from a manager to achieve replenishment of the product comprises:
   receiving an instruction from the manager at a specific time interval to achieve replenishment of the product.

7. The method according to claim 1, further comprising:
   sending a notification to replenish the product in the warehouse in time in response that the product stock quantity in a warehouse is less than or equal to the product replenishment quantity.

8. An apparatus for replenishing products, comprising:
   one or more processors;
   a storage apparatus, configured to store one or more programs which, when executed by the one or more processors, cause the one or more processors to:
   acquire, by means of a warehouse management system or a smart shelf, a product quantity in a display area and a maximum product display quantity in the display area, wherein the product quantity in the display area is a number of existing products on the smart shelf, and the maximum product display quantity in the display area is a maximum number of products carried on the smart shelf, so as to obtain a product shortage quantity in the display area by subtracting the product quantity in the display area from the maximum product display quantity in the display area, and acquire a product stock quantity in a warehouse by means of the warehouse management system or the smart shelf;
   acquire a product replenishment quantity according to the product shortage quantity in the display area and the product stock quantity in the warehouse, wherein in response to that the product shortage quantity is larger than the product stock quantity, the product replenishment quantity is equal to the product stock quantity, and in response to that the product shortage quantity is smaller than the product stock quantity, the product replenishment quantity is equal to the product shortage quantity;
   send the product replenishment quantity to a personal digital assistant; and
   receive stock keeping unit information input by a worker by means of the personal digital assistant, so as to acquire goods location information of a product, so that the worker completes replenishment of the product according to the goods location information and the product replenishment quantity.

9. A non-volatile computer-readable storage medium, storing a computer program, wherein the computer program implements a product management method when executed by a processor, the method comprising:

acquiring, by means of a warehouse management system or a smart shelf, a product quantity in a display area and a maximum product display quantity in the display area, wherein the product quantity in the display area is a number of existing products on the smart shelf, and the maximum product display quantity in the display area is a maximum number of products carried on the smart shelf, so as to obtain a product shortage quantity in the display area by subtracting the product quantity in the display area from the maximum product display quantity in the display area;

acquiring, by means of the warehouse management system or the smart shelf, a product stock quantity in a warehouse;

acquiring a product replenishment quantity according to the product shortage quantity in the display area and the product stock quantity in the warehouse, wherein in response to that the product shortage quantity is larger than the product stock quantity, the product replenishment quantity is equal to the product stock quantity, and in response to that the product shortage quantity is smaller than the product stock quantity, the product replenishment quantity is equal to the product shortage quantity;

sending the product replenishment quantity to a personal digital assistant; and receiving stock keeping unit information input by a worker by means of the personal digital assistant, so as to acquire goods location information of a product, so that the worker completes replenishment of the product according to the goods location information and the product replenishment quantity.

* * * * *